Nov. 17, 1964 A. J. DOCK 3,156,990

TIME AND WEATHER INDICATOR

Filed July 7, 1961

INVENTOR

AMY J. DOCK

BY B. P. Fishburne, Jr.

ATTORNEY

United States Patent Office 3,156,990
Patented Nov. 17, 1964

3,156,990
TIME AND WEATHER INDICATOR
Amy J. Dock, 26 Broadway, New York 4, N.Y.
Filed July 7, 1961, Ser. No. 122,478
3 Claims. (Cl. 40—132)

This invention relates to a time and weather indicator or the like.

An object of the invention is to provide a novelty indicator for continuously or periodically visibly indicating the hour of the day and information about the weather including such elements as temperature, humidity, barometric pressure, wind direction and whether the day is fair, cloudy, rainy and/or windy.

Another object is to provide an indicator of this type which may constitute a portion of an outdoor advertising sign or display on buildings, and which is also particularly well adapted for indicating the time and weather conditions on television or the like.

A further object is to provide an indicator means of the above-mentioned character which may be manufactured in various sizes to suit various installations, indoors or outdoors, and which is adapted to be remotely controlled during operation.

Other objects and advantages of the invention will be apparent during the course of the following description.

Figure 1:
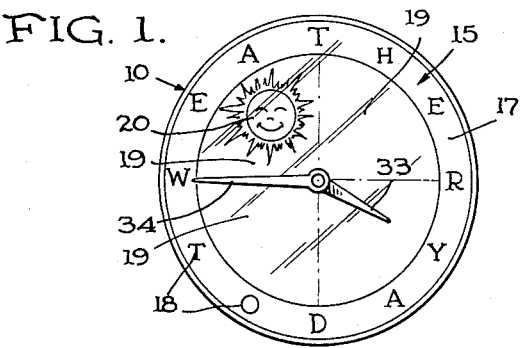
Figure 2:
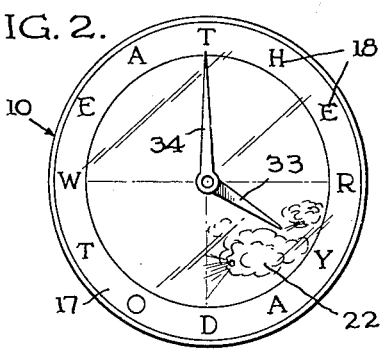
Figure 3:
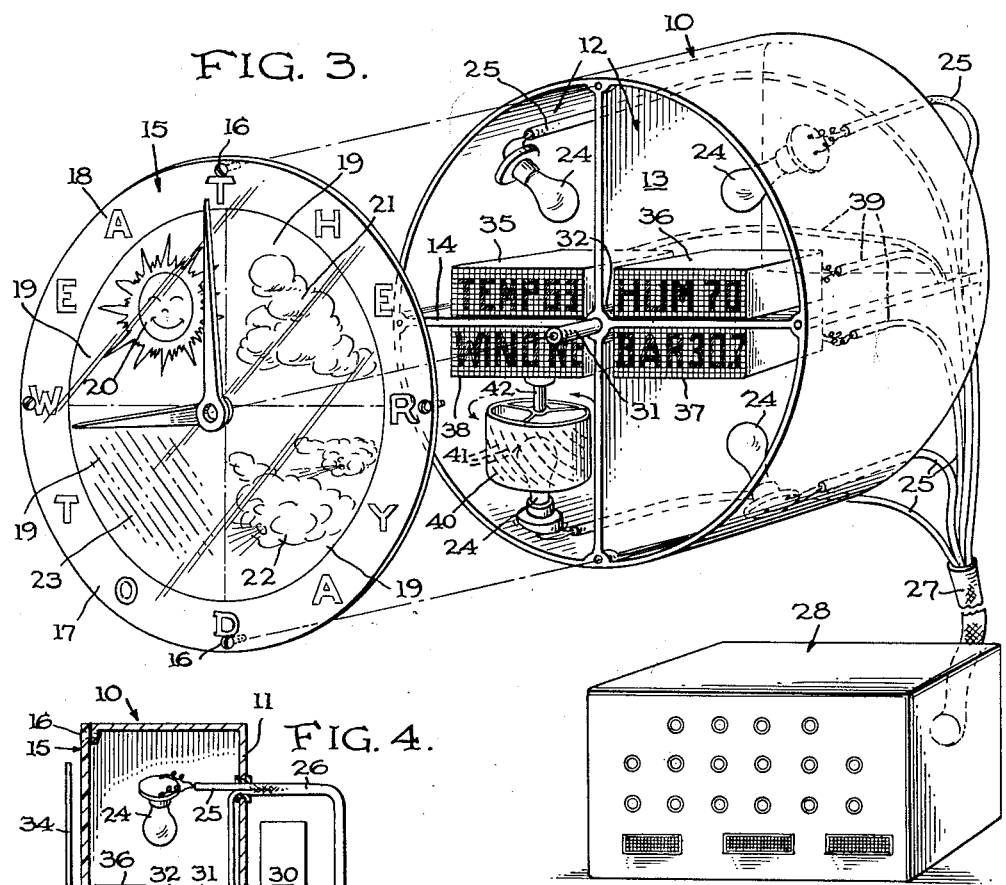
Figure 4:
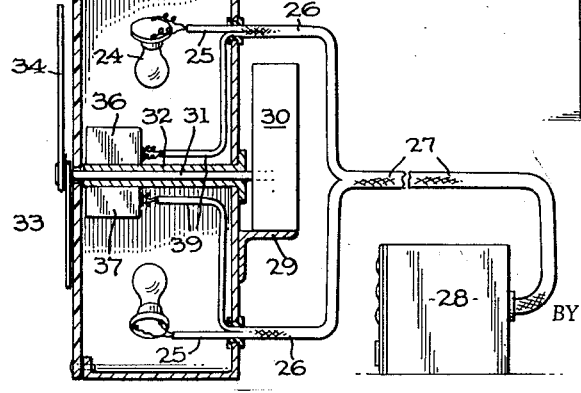

In the accompanying drawings forming a part of this application and in which like numerals are employed to designate like parts throughout the same, FIGURE 1 is a front elevation, partly diagrammatic, of a time and weather indicator according to the invention and showing a particular time of day and condition of the weather, FIGURE 2 is a similar view wherein the device is indicating a different time of day and a change or different condition of the weather, FIGURE 3 is a partly diagrammatic and partly exploded perspective view of the indicator according to one preferred embodiment of the invention, FIGURE 4 is a partly diagrammatic central vertical section through the indicator with parts in elevation and parts broken away.

In the drawings, wherein for the purpose of illustration is shown a preferred simplified embodiment of the invention, the numeral 10 designates an opaque cylindrical casing having a back wall 11 and being open at its forward end. The interior of the casing 10 is divided into preferably four circuferentially arranged chambers 12 of equal size by opaque diametrically extending partition walls 13 and 14, arranged at right angles and preferably joined integrally to the cylindrical side wall of the casing 10 and extending from the front to the back thereof.

A dial or cover plate 15 for the front of the casing 10 is provided and detachably secured thereto with screws 16, or the like. The dial 15 has a marginal annular portion 17 which may be opaque and provided upon its front face with a plurality of circumferentially equidistantly spaced visible characters 18, preferably twelve in number, as shown, to correspond to the hours of the day. As illustrated in the drawings, the characters 18 preferably spell out the words "Weather Today". It preferred, the characters 18 may be numerals indicative of the twelve hours of the day or night or they may be characters or indicia of any other preferred form. The characters 18 and in fact the entire dial 15 may be suitably illuminated exteriorly by means not shown in the drawnigs, and the characters 18 may be of the type which glow in the dark or they may be formed of light-reflecting material or the like.

Inwardly of the opaque annular marginal portion 17, the body of the dial is formed of preferably semi-opaque or translucent material, such as frosted glass or translucent plastics material or the like, either clear or tinted.

Etched or otherwise similarly formed upon the central translucent portion of the dial 15 in four quadrant areas 19 thereof are fixed designs 20, 21, 22 and 23 indicating respectively the usual conditions of the weather, namely fair or sunny, cloudy, windy and precipitation. When the translucent central area of the dial 15 is not illuminated from within the casing 10, the etched designs 20, 21, 22 and 23 are substantially non-visible to the eye viewing the dial from some external location. When the translucent area of the dial is illuminated from within the casing by means to be described, the designs 20 through 23 are rendered clearly visible to the observer to indicate the condition of the weather, as will be further described.

Within each of the quadrant chambers 12, rearwardly of the dial 15, is fixedly mounted a source of illumination, such as a light bulb 24, connected by a suitable wire 25 extending through the rear wall of the casing and forming a part of a branch cable 26, in turn leading into a main cable 27, extending to a remotely located electrical control unit of any conventional and well-known type designated by the numeral 28.

The opaque partition walls 13 and 14 confine the light from each source 24 within the particular quadrant chamber 12, so that each light source can illuminate only the particular translucent quadrant area 19 directly in front of it when energized. That is to say, the illumination produced by one of the light bulbs 24 renders visible to the outside observer only the one normally invisible design 20, 21, 22 or 23 directly in front of it, and no illuminating effect on the other translucent quadrant dial areas is produced.

Fixedly mounted upon a bracket 29 secured to the back wall 11 is a conventional clock mechanism 30 which may be electrical or mechanical. A horizontal axially extending shaft 31 journaled for rotation within a central sleeve 32, rigid with the casing, is driven by the clock mechanism and projects forwardly through a central opening in the dial 15. The usual hour and minute hands 33 and 34 are carried by the shaft 31 forwardly of the dial 15 to coact with the visible characters 18 for indicating the time to the observer. The clock mechanism is shown diagrammatically only and the mechnism is conventional and need not be dealt with in detail herein. The shaft 31 is constructed in the manner usual in clocks to impart movement to the hands 33 and 34 in proper relation to indicate the time. If preferred, no motor means for the clock hands need be provided in the indicator and the hands may merely be adjusted manually to show the particular time of day, as where the device is being shown for a brief moment on a news, time and weather television program or the like.

Conventional electrically operated illuminated read-out units 35, 36, 37 and 38 are rigidly secured to the top and bottom of the partition wall 14 as shown in FIGURE 3, just rearwardly of the dial 15. One read-out unit is contained within each quadrant chamber of the casing 10, as shown. Electrical cables 39 lead from the read-out units and through the back wall 11 of the casing and into the branch cables 26 and main cable 27 leading to the control unit 28. As indicated clearly in FIGURE 3, the read-out unit 35 is adapted when energized to visibly indicate the temperature, the unit 36 indicates the relative humidity, the unit 37 the barometric pressure, and the unit 38 the wind direction and/or velocity. The front faces of the read-out units may be translucent or opaque, and the indicating portions or areas of these faces may be transparent, frosted or semi-transparent so as to clearly reveal the weather indicia when the read-out units are energized and illuminated under influence of the remote controller 28. The read-out units and their electrical controls are conventional, as stated, and well known to those skilled in the art and need not be described more fully herein. They form a part of the present invention only in combination with the other elements of the device and no claim is made to the novelty of the read-out units per se or aside from the combination.

Mounted for rotation around the light bulb 24 in the quadrant chamber 12 adjacent the precipitation indicating design 23 is a cylindrical tubular preferably opaque or semi-opaque shade 40 having a multiplicity of small inclined light transmitting slits 41 formed therethrough to project light upon the adjacent quadrant area of the dial 15 in such a manner that the appearance of falling rain is simulated when the light bulb 24 is energized. This falling rain effect may be utilized in conjunction with the design 23 or without the design, if preferred, or the rotary shade 40 may be omitted and the rainfall design 23 alone may be employed. The shade 40 is suspended in surrounding relation to the adjacent light bulb 24 by a shaft 42, which may be driven by a suitable motor or the like within the read-out unit 38.

In use or operation, the indicator may be displayed on television or it may constitute an indoor or outdoor fixed installation alone or as a component part of an advertising display or sign. The clock works if mechanical or electrical in nature operate in a conventional manner to indicate the time by coaction of the hands 33 and 34 with the characters 18. Where the device is displayed only momentarily on television, the clock hands may be manually set to indicate the hour, half-hour or quarter-hour and in such case, no clock works or motor are required.

The read-out units 35 through 38 may be operated from the remote controller 28 in a conventional manner and in accordance with known information from the weather bureau to periodically indicate the temperature, humidity, barometric pressure and wind direction, as on a television program. The illuminated indicia on the front faces of the read-out units is visible through the translucent area of the dial 15.

Under influence of the controller 28, each light bulb 24 is separately illuminated at the required time to render visible to the observer the particular normally invisible design 20, 21, 22 or 23, to indicate that the weather is sunny, cloudy, windy or rainy. The rotary shade 40 may be activated from the controller 28 simultaneously with the illumination of the precipitation design 23. Obviously only one of the etched designs on the dial 15 will be illuminated at one time to indicate the present condition of the weather in a normal situation, although in cases where weather is sunny and windy simultaneously or cloudy and windy or windy and rainy, etc., two or more of the etched designs may be simultaneously rendered visible by two or more of the light bulbs 24. The read-out units 35–38 may be activated while the designs 20–23 are illuminated or while these designs are non-illuminated, as found desirable. The device is therefore capable of indicating substantially simultaneously the time of day, the condition of the weather, the temperature, relative humidity, barometric pressure and the wind direction or velocity. The device is compact, simple in construction and may readily be constructed in a thoroughly weather-tight manner for outdoor installation.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A time and weather indicator or the like comprising a casing having internal partition walls dividing the casing into a plurality of separate light chambers, a separate source of light in each chamber of the casing to illuminate such chamber separately from all of the other chambers, a dial for the casing covering corresponding ends of said chambers and being at least in part translucent and bearing normally invisible indicia on separate areas thereof adjacent said chambers to indicate conditions of the weather upon being illuminated by the light sources in said chambers, normally invisible read-out devices in said chambers rearwardly of the dial and visible therethrough when illuminated to indicate additional weather conditions, time indicating indicia upon said dial, and clock hands associated with the dial for coaction with said time indicia of the dial.

2. A time and weather indicator comprising a cylindrical opaque casing having internal radial opaque partition walls dividing the casing into quadrant light chambers adapted to be separately illuminated, a separate light source in each said chamber, control means to energize the light sources separately or in groups and selectively, corresponding ends of said chambers being open, a dial on said casing adjacent the chamber open ends, said dial being translucent and having quadrant areas adjacent the chamber open ends bearing normally invisible weather indicia which is rendered visible by light in the adjacent chamber, separate normally invisible weather indicia means within said chambers adapted to be illuminated and visible through said translucent dial, and rotary shade means adjacent the light source in one light chamber and being apertured to project light on one of said quadrant areas in a manner which simulates falling rain when the particular light source is energized.

3. An indicator of the character described comprising an opaque casing having partition means forming a plurality of opaque chambers within the casing and with corresponding ends of the chambers open for the transmission of light therefrom, a separate light source within each chamber, means to selectively activate each light source or to activate groups of the light sources simultaneously, a translucent dial overlying the open ends of said chambers to be illuminated on localized areas thereof by light emanating from said chambers, said localized areas each bearing distinctively different and normally invisible weather condition indicia, said indicia becomng visible to the eye upon illumination of said localized areas selectively by said light sources, and electrically operated normally invisible read-out devices within said chambers and adapted to be illuminated and become visible through said dial and bearing further indicia relative to weather and atmospheric conditions, said further indicia viewable simultaneously with the aforementioned weather condition indicia.

References Cited in the file of this patent

UNITED STATES PATENTS

| | | |
|---|---|---|
| 1,117,907 | Richardson | Nov. 17, 1914 |
| 1,370,307 | Gross | Mar. 1, 1921 |
| 1,619,096 | Walsh | Mar. 1, 1927 |
| 2,159,328 | Horinstein | May 23, 1939 |
| 2,163,188 | Bosche | June 20, 1939 |
| 2,200,021 | Clark | May 7, 1940 |
| 2,201,809 | Brown | May 21, 1940 |
| 2,336,548 | Kimball | Dec. 14, 1943 |
| 2,763,122 | Hayes | Sept. 18, 1956 |